United States Patent
Kennedy et al.

[11] Patent Number: 6,163,594
[45] Date of Patent: *Dec. 19, 2000

[54] CALL YOURSELF BERT TESTING OF ISDN LINE

[75] Inventors: Michael Kennedy, Ventura; Paul H. Katz, Westlake Village; Roy L. Soto, Moorpark, all of Calif.

[73] Assignee: Harris Corporation, Melbourne, Fla.

[*] Notice: This patent is subject to a terminal disclaimer.

[21] Appl. No.: 09/433,269

[22] Filed: Nov. 3, 1999

Related U.S. Application Data

[63] Continuation of application No. 08/984,230, Dec. 3, 1997, Pat. No. 5,982,851.

[51] Int. Cl.[7] .............................. H04M 1/24; H04M 3/08; H04M 3/22
[52] U.S. Cl. .................................. 379/21; 379/5; 379/27; 379/32; 370/251
[58] Field of Search .............................. 379/1, 5, 21–22, 379/24, 27, 29, 30, 32; 370/241, 249, 251

[56] References Cited

U.S. PATENT DOCUMENTS 5,982,851  11/1999  Kennedy et al. ......................... 379/21

*Primary Examiner*—Duc Nguyen
*Attorney, Agent, or Firm*—Allen, Dyer, Doppelt, Milbrath & Gilchrist, P.A.

[57] ABSTRACT

A portable ISDN test set contains test circuitry that is controllably operative to automatically test the ISDN commmunication capability of an ISDN circuit. In response to a user operating a prescribed input/output element of a user interface of the test set, the test set's supervisory control processor executes a routine that places an ISDN call over a first bearer channel of the ISDN circuit, the first bearer channel having a first directory number, through a public switched telephone network to a second directory number associated with a second bearer channel of the ISDN circuit. The ISDN call is thus routed by the public switched telephone network back to the ISDN test set. When the ISDN call is received by the test set, it is automatically looped to the public switched telephone network, so that the call is rerouted to the first directory number associated with the first bearer channel to the ISDN test set. When the looped back call is answered, a BERT is conducted over the dual looped bearer channel pair, thereby testing the full 128 Kbps bearer channel bandwidth of the ISDN circuit. The automated testing routine includes a subroutine that automatically derives the first and second directory numbers from respective user-supplied service profile identifiers for the first and second bearer channels.

10 Claims, 6 Drawing Sheets

6,163,594

CALL YOURSELF BERT TESTING OF ISDN LINE

CROSS-REFERENCE TO RELATED APPLICATIONS

This is a continuation of application Ser. No. 08/984,230, filed Dec. 3, 1997, now U.S. Pat. No. 5,982,851 issued Nov. 9, 1999.

The present application is a continuation-in-part of co-pending U.S. patent application Ser. No. 08/885,117, filed May 13, 1997, entitled: "Test Set Using ISDN Bearer Channel for Testing Telephone Line," by R. Soto et al (hereinafter referred to as the '117 application), assigned to the assignee of the present application, and the disclosure of which is herein incorporated.

The invention disclosed in the present application also relates to subject matter disclosed in the following co-pending U.S. patent applications, each of which is filed coincident with the filing of the present application, is assigned to the assignee of the present application, and the disclosures of which are herein incorporated: Ser. No. 08/984,287, entitled "Testing of ISDN Line via Auxiliary Channel Signaling," by M. Dipperstein et al, (hereinafter referred to as the '287 application); Ser. No. 08/984,515, entitled "Automated Master-Slave Connectivity for Dry Loop ISDN Line," by R. Soto et al, (hereinafter referred to as the '515 application); Ser. No. 08/984,284, entitled "User Selectable Overlap and Enbloc Speed Dialing of ISDN Line," by Paul Katz et al, (hereinafter referred to as the '284 application); and Ser. No. 08/984,233, entitled "Interactive Contextual-Based Assistance for Portable ISDN Test Set," by P. Katz et al, (hereinafter referred to as the '233 application).

FIELD OF THE INVENTION

The present invention relates to telecommunication systems, and is particularly directed to a communication and testing control mechanism, that is incorporated within a craftsperson's test set having an architecture of the type described in the above-referenced '117 application, for facilitating the testing of an ISDN communication circuit.

BACKGROUND OF THE INVENTION

As described in the above-referenced '117 application, a variety of telecommunication test units have been proposed for testing different types of digital signalling circuits. Such circuits may include, but are not limited to, those transporting high bit rate digital subscriber line (HDSL) signals, asymmetrical digital subscriber line (ADSL) signals, digital data service (DDS) signals and integrated services digital network (ISDN) signals. Unfortunately, such conventional test units are relatively cumbersome and hardware-intensive devices, typically resident in a telcom service office or other fixed system installation, that affords only a single point of access to the circuit of interest.

A non-limiting example of such a conventional test unit is described in the U.S. Pat. No. 5,208,846, to Hammond et al, entitled: "Subscriber Loop Tester for Telephone Switching Systems." In order to be connectable with various types of telecommunication circuits, the Hammond et al test unit contains different types of line interfaces/jacks. Determining which jack is to be used requires that the test system operator have a priori knowledge of the communication link to which the test set is to be coupled. Without this knowledge, the user does not know to which jack the line should be connected, and cannot readily configure the test unit to support a particular user interface and associated termination hardware.

As noted above, conventional test units are relatively large and fixed pieces of equipment, so that they are not readily suited for use in the field (i.e., they are not portable), so that they cannot be readily interfaced with any accessible location along a communication link. This relatively poor facility of transport and ready connection to any location along a link to be tested also limits the practicality and effectiveness of such test units.

These shortcomings have become a particular concern to telecommunication service providers, especially with the continuing expansion and demand for integrated services digital network (ISDN) services. Not only is there currently a need for a practical, portable test set that is capable of testing already installed ISDN circuits, but one which can perform 'dry loop' line testing, prior to its use for ISDN service; namely, there is a need for an ISDN test device that will permit a circuit to be 'prequalified' (as ISDN-capable), before ISDN equipment is purchased and connected to the line to be used for ISDN service.

Advantageously, the portable test set described in the above-referenced '117 application contains a communication architecture that is readily interfaced with virtually any location along a line/circuit to be tested, so as to allow testing of the line, irrespective of its configuration (e.g., two-wire vs. four-wire), or the type of signals that may be conveyed over the line (analog or digital). In addition to circuitry for testing the operation of a standard analog (POTS) line, the portable test set described in the '117 application contains a digital communications controller and associated digital signalling interface circuits, including both 'U' interface and 'S/T' interface circuits.

Thus, the test set can be interfaced with either a two-wire network link or a four-wire customer premises link, and may transmit and receive ISDN bearer channel messages over whatever line to which it is connected. The contents of such bearer channel messages may be defined to evoke prescribed responses from a companion test set coupled to another portion (relatively far end) of the communication circuit of interest, so that the line linking the two test sets may be tested. When two such test sets are interfaced with spaced apart locations of the circuit/line under test, they may operate in respective master and slave modes, allowing a craftsperson using the master test set to initiate a bit error rate test (BERT) from one end of the circuit, and derive a measure of the operational performance characteristic of the in-between segment of the circuit.

SUMMARY OF THE INVENTION

The present invention is directed to an enhancement of the ISDN communication and testing capability of the test set described in the '117 application, that not is only capable of performing line prequalification and post installation testing, but does so in a manner that simplifies the interaction between the user/craftsperson and the test set, thereby minimizing line testing inaccuracies (which often depend upon the skill and familiarity of the technician with ISDN communications) and improving performance. In this regard, it has been observed that perhaps the most frequently (if not always) conducted exercise by a service technician dispatched to troubleshoot an ISDN line is a BERT. Indeed, in many cases, the BERT may be the only test that is performed by the craftsperson; if the line passes the BERT, the craftsperson is done—no further testing of the line is necessary.

As a consequence, the simpler the procedure for conducting the BERT—the better. Since each bearer channel of an ISDN line is capable of individually supporting 64 Kbps of traffic, it is necessary to test each bearer channel. If a BERT is performed on each channel separately, the time required to test the channels individually is at least doubled. Moreover, since an ISDN customer may simultaneously utilize the full bandwidth capability of both channels, e.g., for 128 Kbps internet access, it is necessary to conduct a BERT of both bearer channels at the same time.

In accordance with the invention, both of these objectives—simplicity and simultaneous 128 Kbps bearer channel bandwidth testing—are successfully accomplished by what is an extremely simplified (from the craftsperson/user's perspective) BERT message exchange sequence, that only requires the service technician to enter supplied service profile identifiers (SPID)s and operate two function keys on the test set—the MENU key (that calls up a menu listing the BERT as an option), and an AUTO (for automatic) softkey option on the displayed menu.

In accordance with a non-limiting example of a telephone network, the U-interface of the test set of FIG. 1 may be coupled to a two-wire line intended to provide ISDN service to customer premises equipment. The two-wire line extends to a public switched telephone network (PSTN) and is capable of transporting two bearer channels (B1, B2), each of which has its own (seven digit) telephone (directory) number. The central office switch may comprise any one of a variety of different switch types, each of which has its own SPID, which is not necessarily the same as that for any of the other switch types.

To place an ISDN call, it is necessary that the calling test set be properly preconfigured with a prescribed set of communication parameters. These parameters include the type of telecommunications switch (and its associated protocol) employed in the local service provider's central office facility, the local directory numbers, including area codes, associated with the two ISDN bearer channels, and one or more service profile identifiers, or SPIDs.

The switch type, protocol and SPID parameters are routinely supplied by the telephone service provider, so that when the craftsperson is dispatched to troubleshoot an ISDN line, the trouble ticket for that job will contain the SPIDs associated with the respective bearer channels. As pointed out above, to gain access to the ISDN line from the customer premises location of the terminal device, the craftsperson must inform the central office switch of the SPIDs associated with the two bearer channels.

Pursuant to the invention, the respective SPIDs associated with the bearer channels of the line under test (as provided on the trouble ticket) are the only parameter information that need be entered by the craftsperson. The directory numbers associated with the bearer channels are derived automatically from the respective SPIDs and displayed to the technician, so that he can edit either number in the event either SPID is not correctly entered. If the user properly has entered the SPIDs from the trouble ticket, then the only additional operations are invoking the MENU key and the AUTO option from the displayed menu.

When the craftsperson invokes a MENU key on the test set keypad, an operational option menu is displayed. As a precursor the automatic call yourself BER test, the user then enters the SPID or SPIDs listed on the trouble ticket. As the SPIDs are entered they are displayed for review, and correction, as necessary by the user. In addition, entry of each SPID invokes an automated directory number derivation routine. The craftsperson then initiates the automated call yourself BER routine, by simply invoking the AUTO option listed on the menu displayed on the test set's display screen.

The routine causes the test set to place a call to itself over the public telephone switched network, by going off-hook on one of the bearer channels and dialing the directory number associated with the other bearer channel. At the central office switch, the incoming call is directed to the called number of the ISDN line under test. When the incoming call on the called channel is received by the test set, the routine generates an audible ringing signal, to advise the user of the incoming call, and the call is then automatically answered without user intervention (since the test set's supervisory microcontroller knows that it is calling itself).

When the incoming call on the other bearer channel is answered, the routine then loops back that channel to the PSTN switch, which provides cross-connectivity between the B1 and B2 channels. Therefore, by looping back the called bearer channel over the calling bearer channel, the test set causes a dual channel loopback path, containing both the B1 and B2 channels, to be established through the switch.

The automated call yourself BERT routine next performs a BERT, by transmitting a pseudo random bit stream over the sourcing bearer channel. Whatever data is returned over the looped back bearer channel is compared with the contents of the transmitted pattern to derive a bit error ratio (BER) and the number of errors and the number of errored seconds, which are displayed to the user. The BERT continues until either the user manually intervenes by selecting a stop key on the displayed test set menu display, or a prescribed time-out expires.

In accordance with the automated directory number derivation subroutine, a SPID entered by the user is examined to determine whether it is at least eight digits in length. If the SPID length is less than eight digits, the directory number is set to a binary null character (0), and no further processing is performed. If the SPID length is at least eight digits, the first digit is examined to determine whether it has the ASCII value of 0. If the examined digit is not 0, the directory number subroutine determines whether there are at least ten digits remaining after the current digit. If not, the subroutine sets the (empty) directory number to a binary null character (0), and no further processing is performed.

If the currently examined digit is a 0, the subroutine determines whether there are any digits remaining after the current digit. If not, it sets the (empty) directory number to a binary null character (0), and no further processing is performed. However, if there are any digits remaining after the current digit, the subroutine increments to the next succeeding digit, and determines whether it has the ASCII value of either 0 or 1. If so, the subroutine again determines whether there are any digits remaining after the current digit, as described above.

If not, the subroutine proceeds determines whether there are at least seven digits remaining after the current digit. If not, the subroutine sets the (empty) directory number to a binary null character (0), and no further processing is performed. However, if there are at least seven digits remaining after the current digit, the subroutine stores the next seven digits as the directory number, and no further processing is performed.

If the currently examined digit is not 0 and there are at least ten digits remaining after the current digit, the subroutine strips off the next three digits (corresponding to the area code) and stores the next seven digits as the directory number, and no further processing is performed.

DETAILED DESCRIPTION

Figure 1:
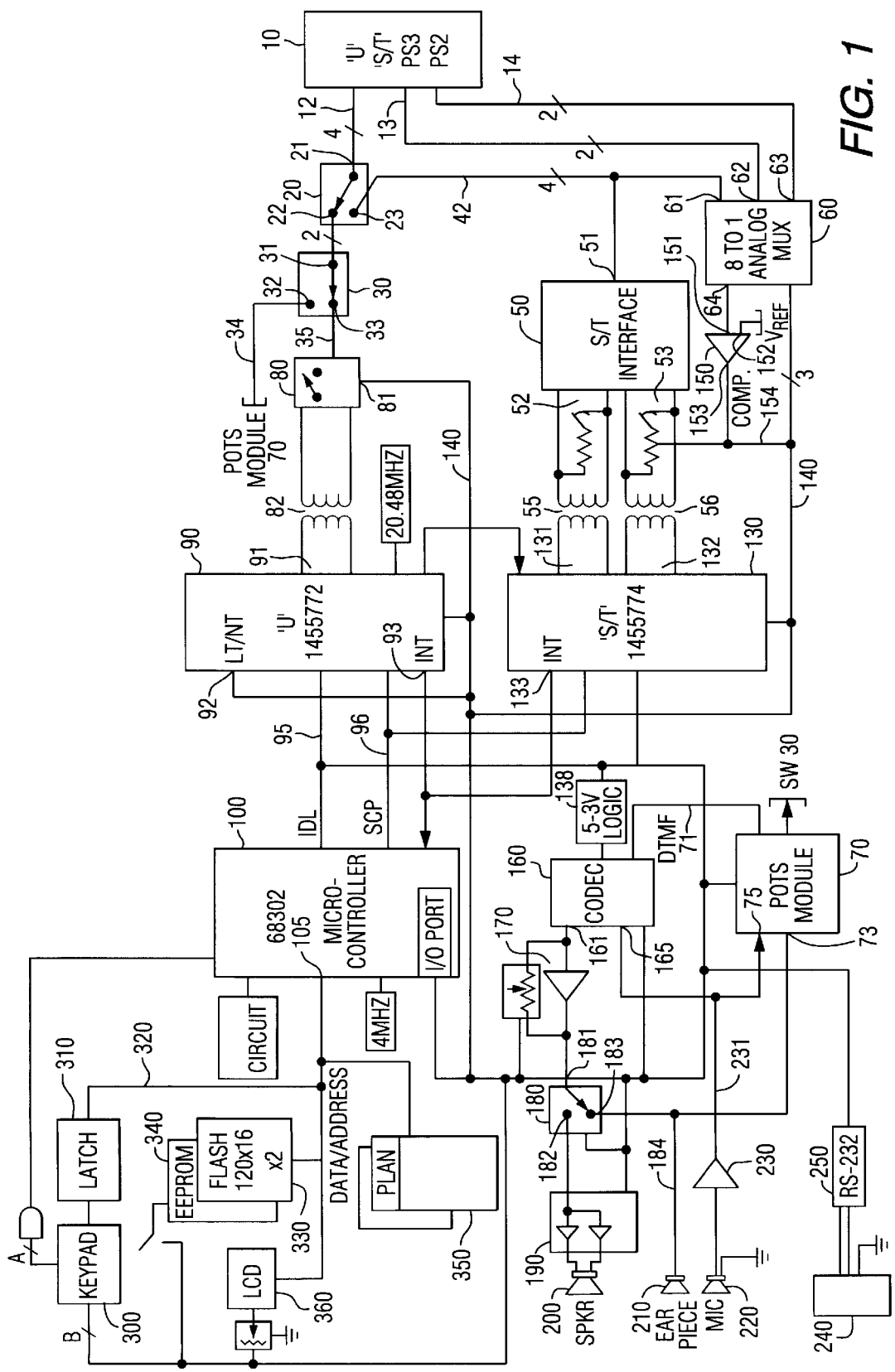
FIG. 1 diagrammatically illustrates the architecture of the ISDN test set architecture described in the '117 application.

Before describing in detail the new and improved call yourself error rate testing mechanism of the present invention, it should be observed that the invention resides primarily in what is effectively an augmentation of the operational control software executed by the supervisory microcontroller of the test set of the '117 application. The circuitry of the test set is otherwise essentially unaffected. Consequently, the architecture of the test set per se, and the manner in which it is interfaced with communication equipment of a telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
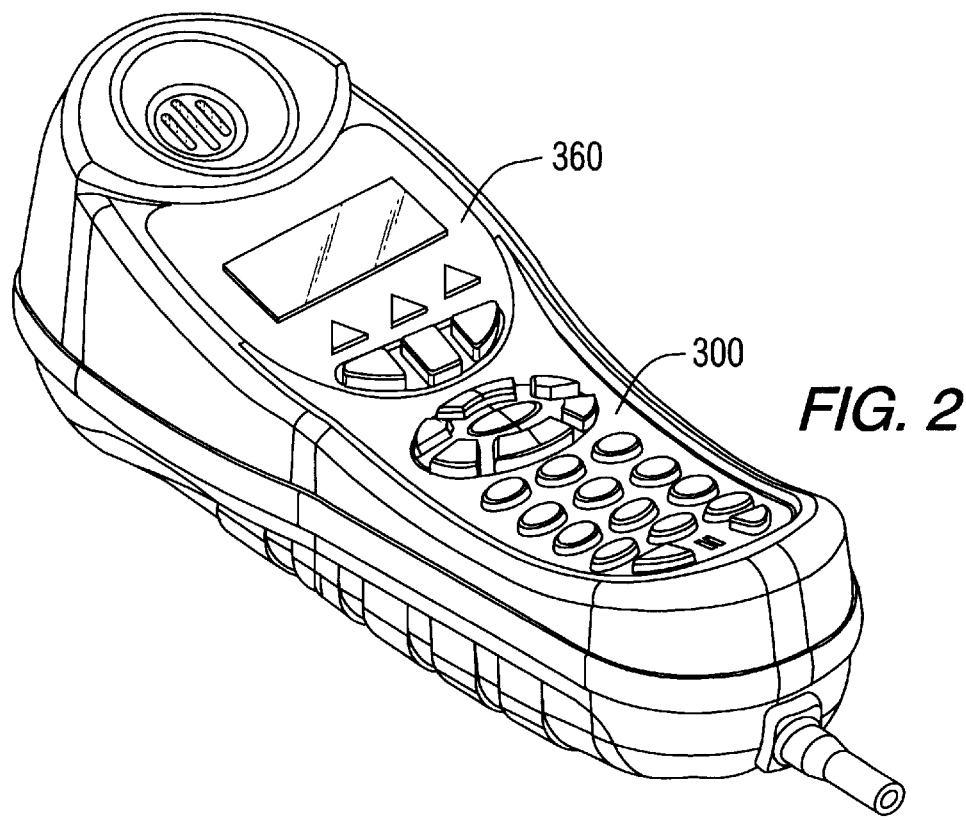
FIGS. 2 and 3 are respective front and rear isometric pictorial views of a housing configuration for the ISDN test set of FIG. 1.
Figure 3:
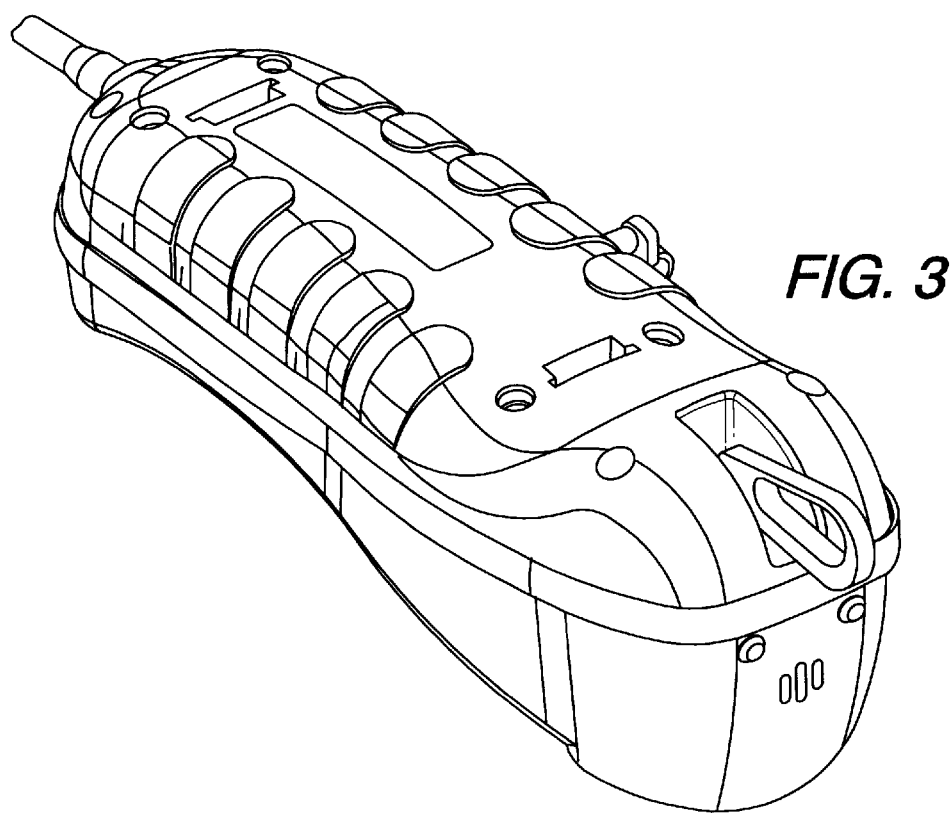

The overall communication and signal processing circuit architecture of a test set of the type described in the '117 application, in which the communication and testing control mechanism of the present invention may be readily incorporated, is diagrammatically illustrated in FIG. 1. To facilitate portability and ruggedized field use, the test set's circuit architecture is preferably housed within a robust protective casing physically configured as diagrammatically illustrated in the isometric pictorial views of FIGS. 2 and 3, and disclosed in detail in the following co-pending U.S. patent applications: Design Ser. No. 29/061,617, entitled: "ISDN Test Set," by R. Soto et al, filed Oct. 28, 1996, which is a continuation-in-part of U.S. Design Ser. No. 29/053,246, entitled: "ISDN Test Set," by R. Soto et al, filed Apr. 18, 1996; and Utility Applications: Ser. No. 08/754,077, filed Nov. 20, 1996, entitled "Telephone Test Set Keypad with Integrated Dynamic Microphone," by E. Zoiss et al; Ser. No. 08/753,101, filed Nov. 20, 1996, entitled "Telephone Test Set LCD Panel Carrier," by E. Zoiss et al; Ser. No. 08/754,075, filed Nov. 20, 1996, entitled "Line Cord Strain Relief Attachment for Telephone Test Set," by E. Zoiss et al; and Ser. No. 08/754,076, filed Nov. 20, 1996, entitled "Variable Geometry Battery Compartment for Accommodating Different Sized Batteries in Telephone Craftsperson's Test Set," by E. Zoiss et al. Each of the above applications is assigned to the assignee of the present application, and their disclosures are herein incorporated.

Referring now to FIG. 1, the communication and signal processing circuit architecture of the test set described in the '117 application is diagrammatically illustrated as comprising a multi-pin modular jack 10, engagable by a multi-pin conductor plug terminating one end of a multi-conductor line cord, through which the test set is connectable with a circuit under test. The respective pins of the modular jack 10 are connected via multi-conductor links 12, 13 and 14 to the internal circuitry of the test set.

For this purpose, a first four-pin link 12, two leads of which are respectively associated with tip and ring lead conductors of multi-pin jack 10, is coupled to a four-pin common port 21 of a first switch 20. A first, two-pin switch port 22 of switch 20 is coupled to a two-pin common port 31 of a second switch 30. A second, four-pin switch port 23 of first switch 20 is coupled to a four conductor link 42 to a four-pin port 51 of a transformer interface 50 and to a four pin input port 61 of an 8:1 analog multiplexer 60. Two-pin links 12 and 13 are coupled from modular jack 10 to respective two pin in ports 62 and 63 of 8:1 analog multiplexer 60.

The 8:1 analog multiplexer 60 has an output port 64 coupled to a first input 151 of a voltage threshold comparator 150. Voltage threshold comparator has a second input 152 coupled to receive a prescribed reference voltage $V_{REF}$. The output 153 of comparator is coupled to an input/output (I/O)—control bus 140 associated with the test set's supervisory microcontroller 100. The multiplexer 60 has a multi-bit steering control input 65 coupled to control bus 140, for selecting which of the respective portions of multiconductor links 42, 13 and 14 is coupled to comparator 150. Should the line voltage of the selected lead exceed the threshold reference voltage $V_{REF}$, the voltage comparator 150 provides an output on a voltage detect line portion 154 of the I/O control bus 140, which is read by the micro-controller 100. The states of the respective sets of leads 12–14 are mapped by an internal truth table used by the microcontroller 100 to identify the type of line to which the test set is connected.

A first, two pin port 32 of the switch 30 is coupled via link 34 to a POTS line interface module 70. Module 70 module contains conventional dial tone detector and DTMF signalling circuitry, and is employed for conducting voice communications, DTMF and dial pulse signalling on a POTS line. A second two pin switch port 33 of switch 30 is coupled via link 35 to a controlled attenuator 80. Attenuator 80 has a control port 81 coupled to the control bus 140, and is transformer-coupled, by way of transformer circuit 82, to a two wire port 91 of standard (two wire) 'U' interface chip 90, used for standard 2B1Q signalling.

The 'U' interface chip 90, which is coupled to and controlled by microcontroller 100, is selectively controlled via a control port 92 to function as either a line termination (LT) or a network termination (NT). As will be described, when either bit error rate testing (BERT) of the line, or dry-loop communications are to be carried out over the line under test, the 'U' interface chip 90 is selectively placed in LT mode. A port 93 provides an interrupt link to the microcontroller 100. Digital data communications between the two-wire 'U' interface chip 90 and the microcontroller 100 are effected by way of a first (IDL) digital serial bus 95 and a second (SCP) digital serial bus 96.

The four-wire transformer interface 50, to the four pin port 51 of which the four lead conductor link 42 is coupled from port 23 of switch 20, has respective pairs of two wire links 52 and 53 transformer-coupled, via transformer pairs 55 and 56, to respective two wire ports 131 and 132 of a (four wire) 'S/T' interface chip 130. Respective controlled attenuators 57 and 58 are coupled across links 52 and 53, and are controlled by way of control bus 140. Like the 'U' interface chip 90, the 'S/T' interface chip 130 is coupled to microcontroller 100 by way LB of the first digital link IDL 95 and the second digital link SCP 96. In addition, it has an interrupt port 133 for providing an interrupt signal to the microcontroller 100.

The first (IDL) digital serial bus 95 is further coupled through a (5V-3V) logic level translation circuit 138 to a CODEC 160. CODEC 160 is coupled via a DTMF link 71 to POTS line interface module 70. The CODEC 160 has a first output port 161 coupled through a controlled gain amplifier 170 to a common/input terminal 181 of a switch 180. Switch 180 has a first output terminal 182 coupled to a speaker amplifier 190, the output of which is coupled to an audio speaker 200. Switch 180 has a second output terminal 183 coupled to link 184 which is coupled to the output of POTS line interface module 70. Link 184 is further coupled to an earpiece receiver transducer 210 of the test set. A microphone (MIC) 220 is coupled to an amplifier 230, the output of which is coupled via link 231 to port 165 of CODEC 160 and to an audio input port 75 of POTS line interface module 70.

An auxiliary digital (RS 232) I/O port is provided by way of a multipin connector 240, such as an RJ-45 jack. This connector is coupled to an RS-232 transceiver 250, which may be used to monitor externally provided bearer (B) channel information or to download communication control software into the microcontroller 100. The RS-232 transceiver 250 is, in turn, ported to I/O-control bus 140.

User/craftsperson inputs for controlling operation of the test set are effected by means of a standard multi-key keypad 300, to which I/O-control bus 140 is coupled. Key depression of the keys of the keypad 300 generate input commands that are buffered in a latch 310, the contents of which are asserted onto a distributed multibit data/address bus 320. Data/address bus 320 is ported to a data/address port 105 of the microcontroller 100. Microcontroller 100 has a limited storage capacity flash memory 330, an EPROM 340 in which the operational software for the microcontroller is stored, and a random access memory 350 for storing data processed by the microcontroller's central processing unit (CPU).

The data/address bus 320 is also ported to an LCD unit 360, which provides an alpha-numeric visual display of a menu of options/actions that may be selectively invoked by keypad inputs from the user, and an indication of the operation of the test set, as microcontroller 100 sequences through stored test routines, to be described. In addition to the LCD unit 360, the test set may employ one or more discrete visual indicators, such as a set of LEDs that are coupled to I/O bus 140, and selectively individually energized by the microcontroller 100 to provide an indication of prescribed status or operational conditions of the line under test such as, but not limited to, ON/OFF hook, "U" or "S/T" sync status, tip/ring polarity and test set battery charging status.

As described in the above-referenced '117 application, the test set architecture of FIG. 1 is able to conduct a number of analog and digital test operations of a line to which it is connected. These test operations include an initial mode termed "LINE IDENTIFICATION MODE" (in which the type of line to which the test set is connected is automatically determined), and "POTS MODE," (for testing a POTS line, in which the tip and ring line portions of the four-wire link 12 are coupled through switches 20 and 30 to the POTS line interface module 70).

In addition, because the test set architecture of FIG. 1 includes both two-wire 'U' interface chip 90 and four-wire 'S/T' interface chip 130, the test set may be used to troubleshoot a potentially faulty digital (e.g., ISDN) circuit that is either upstream (toward the central office), or downstream (toward a remote terminal- customer premises equipment) of the location at which the craftsperson has connected the test set. Where two test sets of the type shown in FIG. 1 are available, the potentially faulty circuit of interest may be tested by placing the test sets in a master-slave mode of operation. The 'master' test set may be connected to a first, test supervisory location of the line, from which the test is to be conducted (such as at a central office line termination location). The 'slave' test set may be connected to a second site of the line, geographically remote from the first site (such as at a network termination of a customer premises). Once a loopback path has been established between the two test sets, a BER test may be initiated from either test set.

In addition to loopback (for bit error rate testing), an echo-back mode of operation may also be used. This mode is somewhat similar to the loopback mode in that it's purpose is to have the slave test set send back to the master test set the contents of a prescribed data sequence. In echo-back mode, however, rather than the slave test set simply operating as a passive loopback device, the slave test set captures and then retransmits data placed on the D channel by the master test set.

Figure 4:
FIG. 4 diagrammatically illustrates a public switched telephone network at opposite ends of which respective master and slave ISDN test sets may be connected.
Figure 5:
FIG. 5 diagrammatically illustrates a dry loop ISDN circuit having opposite ends connected to respective master and slave ISDN test sets.

A voice link may be also established either over a public switched network, as diagrammatically illustrated in FIG. 4, or between two test sets that are connected to opposite ends of a non-powered or 'dry loop' link, as diagrammatically illustrated in FIG. 5, with one of the test sets operating in LT mode as a line termination device, and the other operating in NT mode as a network termination device. Also described in the '117 application is a callback mode of operation, which allows an unmanned slave test set to return a voice call (i.e., without the participation of an attendant craftsperson), and thereby determine whether a voice call can be established over the circuit under test.

As described above, the present invention is directed to an enhancement to the control software, that is executed by the test set's supervisory processor 100, for controlling communication and testing functionality of the test set, including operations described in the '117 application, reviewed briefly above. As will be described, the present invention provides additional testing functionality, termed a "Call Yourself BERT" and described below with reference to FIGS. 6–9, that facilitates use of the test set for bit error rate testing and minimizes errors in the testing of an ISDN circuit.

As noted previously, it has been observed that perhaps the most frequently (if not always) conducted exercise by a service technician dispatched to troubleshoot an ISDN line is a BERT. Indeed, in many cases, the BERT may be the only test that is performed by the craftsperson; if the line passes the BERT, the craftsperson is done—no further testing of the line is necessary. As a consequence, the simpler the BERT—the better. However, since each bearer channel of an ISDN line is capable of individually supporting 64 Kbps of traffic, it is necessary to test each bearer channel. If a BERT is performed on each channel separately, the time required, to test the channels individually is at least doubled. Moreover, since an ISDN customer may simultaneously utilize the full bandwidth capability of both channels, e.g., for 128 Kbps internet access, it is necessary to conduct a BERT of both the B1 and B2 channels at the same time.

In accordance with the present invention, both objectives—simplicity and simultaneous 128 Kbps bearer channel bandwidth testing—are successfully achieved by what is an essentially foolproof (extremely simplified from the user's perspective) BERT message exchange sequence, that only requires the service technician to enter supplied service profile identifiers (SPID)s and two function keys on the test set—1) the MENU key (that calls up a menu listing the BERT as an option), and 2) an AUTO softkey option from the displayed menu.

Figure 6:
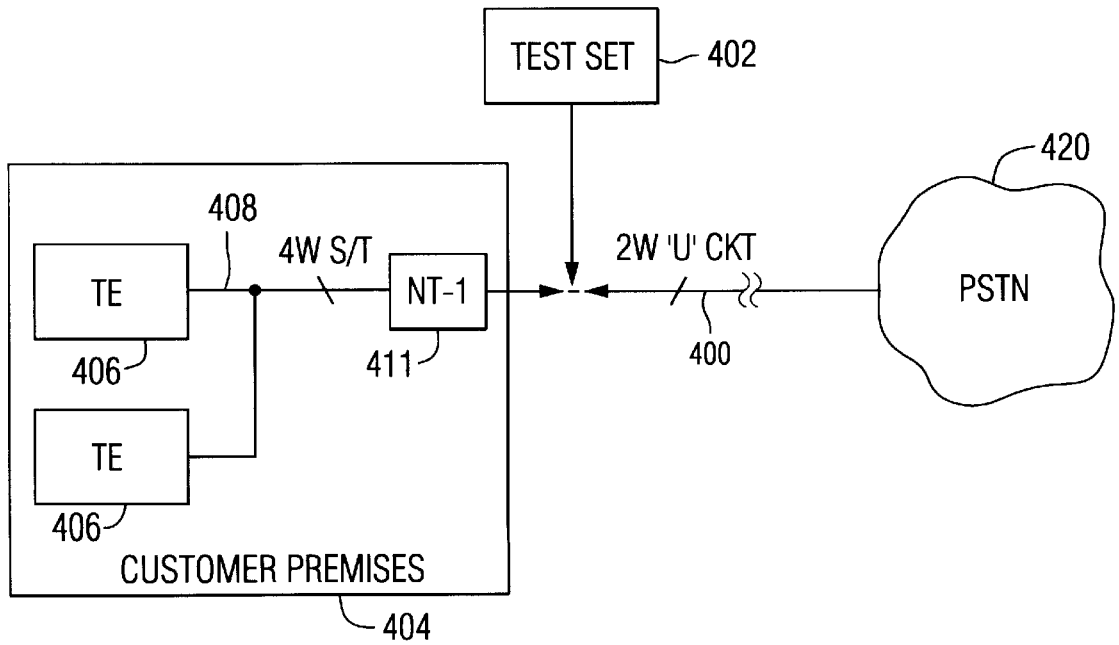
FIG. 6 diagrammatically illustrates a non-limiting example of a telephone network, in which the U-interface of the test set of FIG. 1 is coupled to a two-wire ISDN line that extends to a public switched telephone network (PSTN) and is capable of transporting two bearer channels each of which has its own directory number.

FIG. 6 diagrammatically illustrates a non-limiting example of a telephone network, in which the U-interface of the test set of FIG. 1, shown as test set 402, is coupled to a two-wire line 400 from a customer premises 404. Customer premises 404 may include one or more pieces of terminal equipment 406, coupled over a four-wire S/T interface 408 to a network termination (NT-1) 411, which terminates the line 400. The line 400 extends to a public switched telephone network (PSTN) 420 and is capable of transporting two bearer channels (B1, B2), each of which has its own (seven digit) telephone (directory) number (numbers DNB1, DNB2, respectively). As non-limiting examples, the central office switch may comprise any one of an AT&T 5ESS custom switch, a Northern Telecom DMS-100 custom switch, a Siemens EWSD switch, or National firmware-customized versions of Siemens, Alcatel or Ericcson 5ESS and DMS-100 switches. Each of these respectively different switch types has its own SPID, which is not necessarily the same as that for any of the other switch types.

In order to place an ISDN call, it is necessary that the calling test set be properly initialized or preconfigured with a prescribed set of communication parameters. These parameters include the type of telecommunications switch (and its associated protocol) employed in the local service provider's central office facility, the local directory numbers (LDNs), associated with the two ISDN bearer (B1, B2) channels, and one or more service profile identifiers or SPIDs. A SPID is a sequence of digits, which identifies the ISDN terminal equipment that is coupled to the ISDN switch, and is assigned by the local telephone service provider, when the ISDN line is installed. The number of SPIDs required (0, 1 or 2) will depend upon how the ISDN line is configured.

The switch type, protocol and SPID parameters are routinely supplied by the telephone service provider, so that when the craftsperson is dispatched to troubleshoot an ISDN line, the trouble ticket for that job will contain the SPIDs associated with the respective bearer channels B1 and B2. As pointed out above, in order to gain access to the ISDN line from the customer premises location of the terminal device, the craftsperson must inform the central office switch of the SPIDs associated with the two bearer channels.

Pursuant to the invention, the respective SPIDs associated with the bearer channels of the line under test (as given on the trouble ticket) are the only parameter information that must been entered by the user. The directory numbers associated with each of the bearer channels B1 and B2 are derived automatically from the respective SPIDs and displayed to the user, giving the user the ability to edit either number in the event either directory number was derived incorrectly. However, assuming that the user properly entered the SPIDs from the trouble ticket, then the only additional operations performed by the user are operation of the MENU key 312 and invoking the AUTO option 313 from the displayed menu, shown in the illustration of the test set's display/keypad of FIG. 8.

CALL YOURSELF BERT (FIG. 7)

Figure 7:
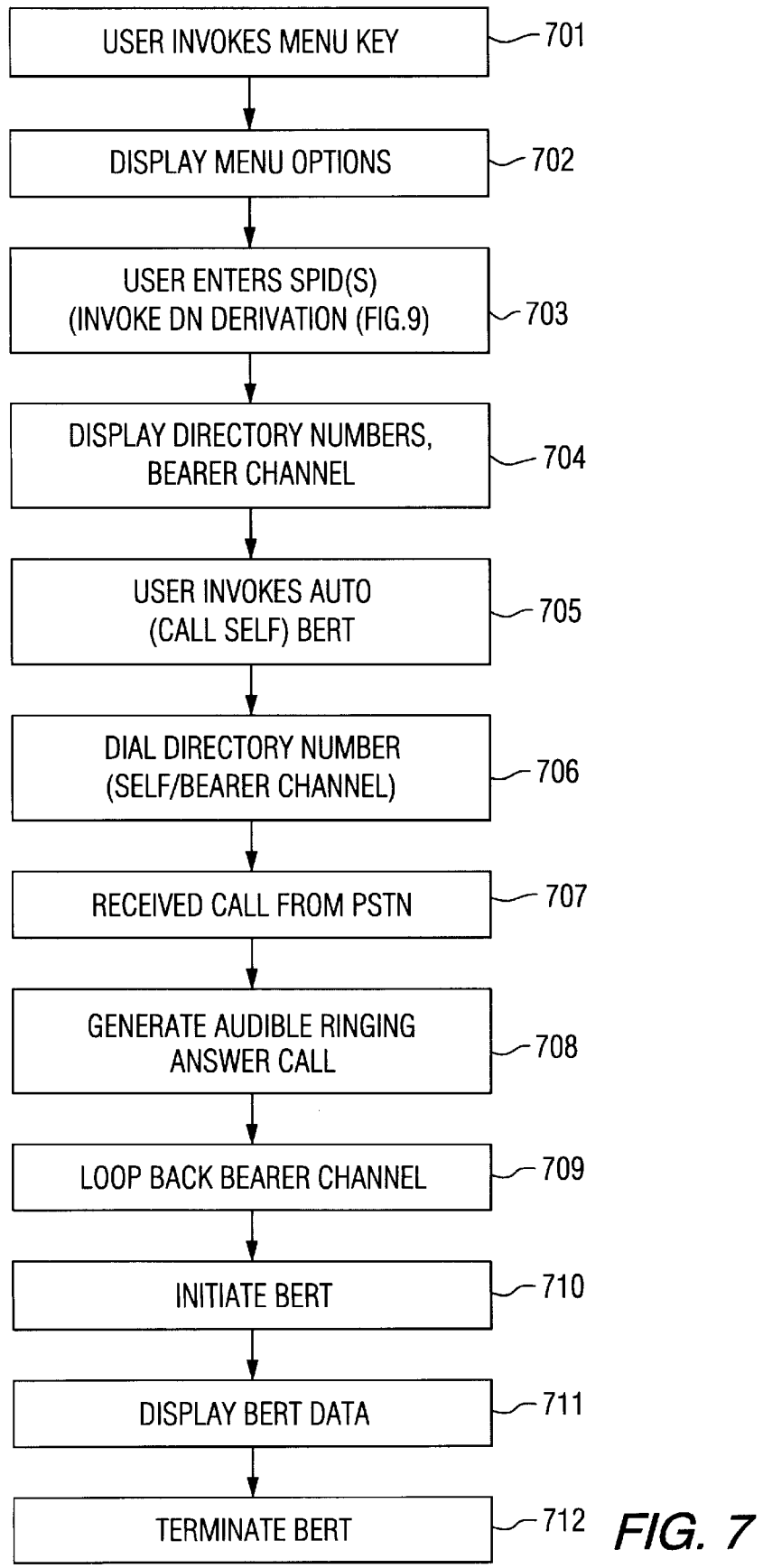
FIG. 7 is a flow chart showing the steps of the call yourself BERT routine of the present invention.
Figure 8:
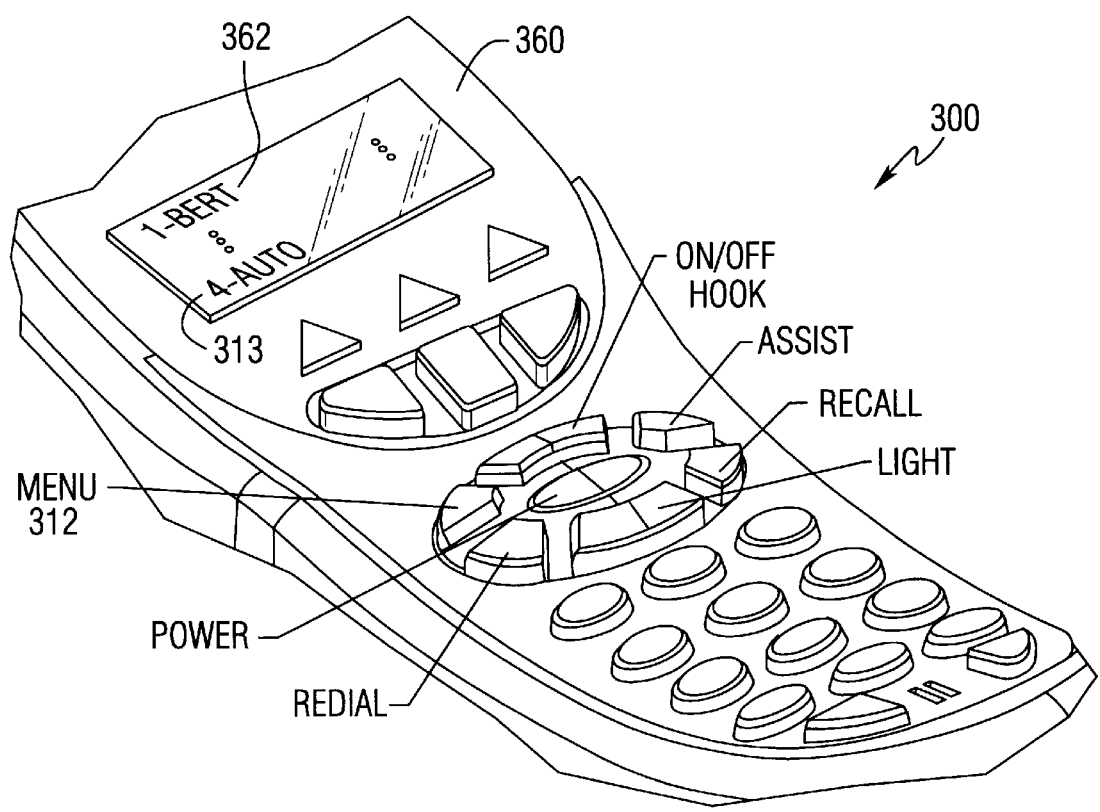
FIG. 8 shows the display and keypad portion of the test set of FIGS. 1–3.

More particularly, as shown at step 701 in the flow chart of the call yourself BERT routine of FIG. 7, in response to the user invoking a MENU key 312 on the test set keypad 300, the operational option menu is displayed in step 702. As a precursor to performing an automatic call yourself BER test (CALL YOURSELF BERT), the user then enters the SPID or SPIDs listed on the trouble ticket. For purposes of. providing a non-limiting example, it will be assumed that the ISDN line has two SPIDs, so that in step 703, the user enters the two listed SPIDs, one of which ($SPID_1$) is associated with a first bearer channel B1, and the other of which ($SPID_2$) is associated with a second bearer channel B2.

As the SPIDs are entered they are displayed for review, and correction, as necessary by the user. In addition, entry of each SPID in step 703 invokes a directory number derivation subroutine shown in FIG. 9, to be described, so that the respective directory numbers for the SPIDs are displayed in step 704; also displayed in the directory number of the bearer channel (e.g., B1), which serves as a default phone number for the test unit. Display of the directory numbers for the two bearer channels again provides the user opportunity to manually correct the DN entries, as necessary. Once the craftsperson is satisfied that the displayed information is correct, then, in step 705, he initiates the AUTO CALL SELF BERT routine, by simply invoking the AUTO option listed on the displayed menu.

The call yourself BERT routine then places a call to itself over the PSTN 420. How the call is placed will depend upon whether the connection is a point-to-point connection (such as that associated with an AT&T 5ESS custom switch) or a point-to-multipoint connection (such as that associated with a Northern Telecom DMS-100 custom switch, a Siemens EWSD switch, or National firmware-customized versions of Siemens, Alcatel or Ericcson 5ESS and DMS-100 switches). As pointed out above, each of these respectively different switch types has its own SPID, which is not necessarily the same as that for any of the other switch types. Moreover, a point-to-point connection has only a single directory number and no SPID.

For this purpose, in step 706, the routine dials a directory number as dictated by the SPID/switch type information previously entered by the user. In the present example, in which it has been assumed that the ISDN line has two SPIDs, the test set goes off-hook on channel B1 and calling the directory number associated with the other bearer channel (here channel B2). Via the switch in the PSTN 420, the call on channel B1 is directed to the called number (channel B2) of the ISDN line under test. When the incoming call on channel B2 is received in step 707, the routine generates an audible ringing signal in step 708, to advise the user of the incoming call on channel B2, and the call is automatically answered (i.e., without user intervention), since the test unit knows that it is calling itself (channel B2).

When the incoming call on the other bearer channel B2 is answered in step 708, the routine then loops back that channel to the PSTN switch in step 709. Since the PSTN switch provides cross-connectivity between the B1 and B2 channels, connectivity is provided between the two bearer channels for the ISDN. Therefore, by looping back the called B2 channel by way of which it has called itself over the B1 channel, the test set causes a dual channel loopback path, containing both the B1 and B2 channels, to be established through the PSTN switch.

Having established a dual channel loopback path, the routine next performs a BERT in step 710. As in the above-described embodiments, the BERT involves the transmission of a pseudo random bit stream over the sourcing bearer channel (here channel B1). In step 711, whatever data is returned over the looped back bearer channel is compared with the contents of the transmitted pattern to derive a bit error ratio (BER) and the number of errors and the number of errored seconds, which are displayed via display 360 to the user. The BERT continues until either the user manually intervenes by selecting a stop key on the test set display, or a prescribed time-out, as shown at termination step 712.

DIRECTORY NUMBER DERIVATION (FIG. 9)

Figure 9:
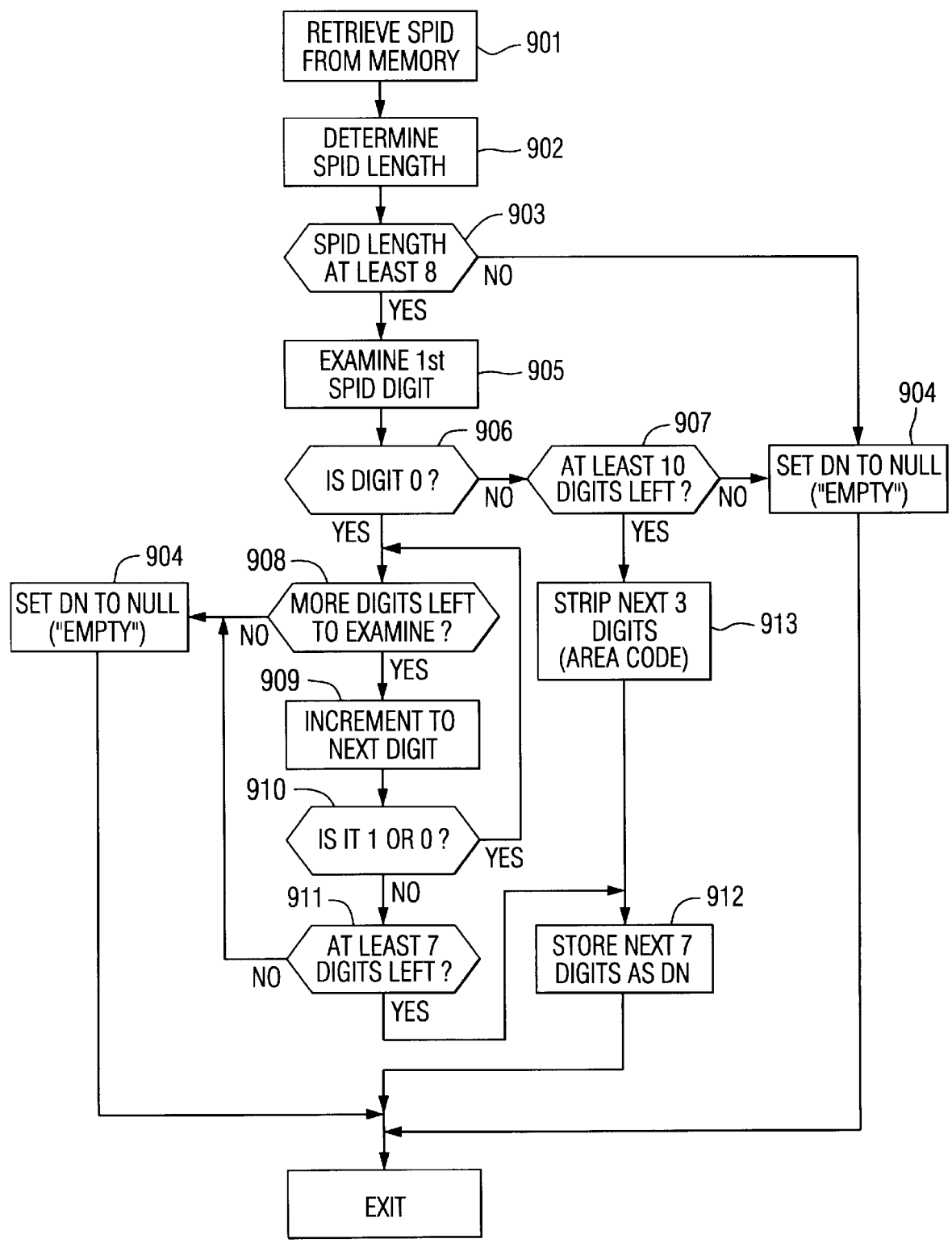
FIG. 9 shows the steps of an automated directory number derivation subroutine.

As described above, the entry of each SPID in step 703 invokes a directory number derivation routine shown in FIG. 9, so that the respective directory numbers for the SPIDs are displayed. The craftsperson then has the opportunity to accept the displayed directory number, or to make changes by use of the backspace key and reentering the correct directory number using the number keys on the keypad 300. (For operation with an AT&T 5ESS point-to-point switch, there is no SPID, so that the user must manually enter the directory number by invoking the directory number option and using the keypad number keys.)

As shown at step 901, the directory number derivation routine begins by retrieving the SPID that has been stored by the user off the trouble ticket in step 703, described above. Next, step 902 determines whether the entered SPID is the required at least eight digits in length. If the SPID length is less than eight digits (the answer to query step 903 is NO), the routine proceeds to step 904, which sets the (empty) directory number to a binary null character (0), and no further processing is performed (the process exits the routine). However, if the SPID length is at least eight digits (the answer to query step 903 is YES), the routine proceeds to step 905, which examines the first digit to determine whether it has the ASCII value of 0.

If the currently examined digit is not 0 (the answer to query step 906 is NO), the routine determines, in step 907, whether there are at least ten digits remaining after the current digit. If the answer to query step 907 is NO), the routine proceeds to step 904, which sets the (empty) directory number to a binary null character (0), and no further processing is performed.

If the currently examined digit is a 0 (the answer to query step 906 is YES), the routine determines, in step 908, whether there are any digits remaining after the current digit. If the answer to query step 908 is NO), the routine proceeds to step 904, which sets the (empty) directory number to a binary null character (0), and no further processing is performed. However, if there are any digits remaining after the current digit (the answer to query step 908 is YES), the routine proceeds to step 909, which increments to the next succeeding digit.

Next, in query step 910, the routine determines whether the current digit has the ASCII value of 0 or 1. If the answer to query step 910 is YES (the current digit has a value of 1 or 0), the routine loops back to query step 908. If the answer to query step 910 is NO, however (the current digit has a value other than 1 or 0), the routine proceeds to query step 911, to determine whether there are at least seven digits remaining after the current digit. If the answer to query step 911 is NO), the routine proceeds to step 904, which sets the (empty) directory number to a binary null character (0), and no further processing is performed. However, if there are at least seven digits remaining after the current digit (the answer to query step 911 is YES), the routine proceeds to step 912, which stores the next seven digits as the directory number, and no further processing is performed.

If the currently examined digit is not 0 (the answer to query step 906 is NO), and the answer to query step 907 is YES (there are at least ten digits remaining after the current digit), the routine proceeds to step 913, which strips off the next three digits (corresponding to the area code) and then proceeds to step 912, which stores the next seven digits as the directory number, and no further processing is performed.

As will be appreciated from the foregoing description, the desire to reduce user participation in conducting bit error rate testing of an ISDN line, while testing full 128 Kbps bearer channel bandwidth, is successfully accomplished in accordance with the present invention, which is configured to automatically execute a BERT message exchange sequence, that employs an automated directory number derivation subroutine, and thereby requires the service technician to only enter supplied service profile identifiers (SPID)s and operate two function keys.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of testing the operation of a communication circuit for transporting digital communication signals comprising the steps of:

(a) interfacing said communication circuit with a test set containing test circuitry that is controllably operative to test digital communication capability of said communication circuit;

(b) causing said test set to place a call over said communication circuit to a public switched telephone network, by way of a first digital communication channel of a digital communication circuit, to a directory number associated with a second digital communication channel of said digital communication circuit, so that said call is routed by said public switched telephone network to said test set;

(c) coupling said second digital communication channel from said test set to said public switched telephone network, so that said call is routed through said network over said first digital communication channel to said test set; and (d) automatically answering the call routed in step (c), and testing a prescribed operational characteristic of said communication link by way of said first and second digital communication channels of said digital communication circuit.

2. A method according to claim 1, wherein step (d) includes generating an audible ringing signal.

3. A method according to claim 1, wherein step (d) comprises performing a bit error rate test by way of said first and second digital communication channels of said digital communication circuit.

4. A method according to claim 1, wherein step (b) includes automatically deriving respective directory numbers associated with said first and second digital communication channels.

5. A method of testing a digital communication circuit comprising the steps of:

(a) interfacing said digital communication circuit with a test set containing test circuitry that is controllably operative to test communication capability of said digital communication circuit;

(b) in response to a user operating a prescribed input/output element of a user interface of said test set, automatically causing said test set to place a call over a first digital communication channel of an digital communication circuit, having a first directory number associated therewith, through a public switched telephone network to a second directory number associated with a second digital communication channel of said digital communication circuit, so that said call is routed by said public switched telephone network to said test set;

(c) in response to receipt of said call to said second directory number, automatically routing said second digital communication channel from said test set to said public switched telephone network, so that said call is routed by said network to said first directory number associated with said first digital communication channel to said test set; and (d) automatically answering the call routed in step (c), and testing a prescribed operational characteristic of said digital communication circuit by way of said first and second digital communication channels of said digital communication circuit.

6. A method according to claim 5, wherein step (b) includes automatically deriving respective directory numbers associated with said first and second digital communication channels.

7. A method according to claim 5, wherein step (d) comprises performing a bit error rate test by way of said first and second digital communication channels of said digital communication circuit.

8. A portable test set for testing the operation of a digital communication circuit, said portable test set comprising a supervisory control processor which is operative to cause said portable test set, when coupled to said communication link by way of one of diverse types of digital communication interfaces, and in response to a user operating a prescribed input/output element of a user interface of said test set, to automatically to place a call over a first digital communication channel of said digital communication circuit, having a first directory number associated therewith, through a public switched telephone network to a second directory number associated with a second digital communication channel of said digital communication circuit, so that said call is routed by said public switched telephone network to said test set and, in response to receipt of said call to said second directory number, to automatically route said second digital communication channel from said test set to said public switched telephone network, so that said call is routed by said network to said first directory number associated with said first digital communication channel to said test set, to automatically answer said call, and to test a prescribed operational characteristic of said digital communication circuit by way of said first and second digital communication channels of said digital communication circuit.

9. A portable test set according to claim 8, wherein said supervisory control processor is operative to automatically derive respective directory numbers associated with said first and second digital communication channels.

10. A portable test set according to claim 8, wherein said supervisory control processor is operative to perform a bit error rate test by way of said first and second digital communication channels of said digital communication circuit.

* * * * *